United States Patent
Nacamuli

(12)
(10) Patent No.: US 6,393,654 B2
(45) Date of Patent: May 28, 2002

(54) ARTICULATION SYSTEM BETWEEN WINDSCREEN WIPER COMPONENTS

(75) Inventor: Marc Nacamuli, Sao Paulo (BR)

(73) Assignee: Electromecanica Dyna S/A, Sao Paulo (BR)

( * ) Notice: Subject to any disclaimer, the term of this patent is extended or adjusted under 35 U.S.C. 154(b) by 0 days.

(21) Appl. No.: 09/734,584

(22) Filed: Dec. 13, 2000

(30) Foreign Application Priority Data

Jul. 6, 2000 (BR) .............................................. 0003099

(51) Int. Cl.[7] .................................................. B60S 1/38
(52) U.S. Cl. ............................... 15/250.46; 15/250.44; 403/24; 403/161; 403/153
(58) Field of Search ......................... 15/250.46, 250.44, 15/250.361, 250.451, 250.452, 250.453; 403/24, 161, 162, 154, 150, 153

(56) References Cited

U.S. PATENT DOCUMENTS

| | | | | |
|---|---|---|---|---|
| 4,788,736 A | * | 12/1988 | Arai et al. ................ | 15/250.46 |
| 4,795,288 A | * | 1/1989 | Sakai ....................... | 15/250.46 |
| 5,183,352 A | * | 2/1993 | Carpenter ................ | 15/250.46 |
| 5,271,122 A | * | 12/1993 | Roth et al. ............... | 15/250.46 |
| 5,647,087 A | * | 7/1997 | Arai ......................... | 15/250.46 |
| 5,647,088 A | * | 7/1997 | Bommer et al. ......... | 15/250.46 |
| 5,661,870 A | * | 9/1997 | Eustache et al. ......... | 15/250.46 |
| 5,819,361 A | * | 10/1998 | Merkel et al. ........... | 15/250.46 |
| 5,974,620 A | * | 11/1999 | Jondin ..................... | 15/250.46 |

FOREIGN PATENT DOCUMENTS

GB 2 181 639 4/1987

\* cited by examiner

*Primary Examiner*—Gary K. Graham
(74) *Attorney, Agent, or Firm*—Larson & Taylor PLC

(57) ABSTRACT

An articulation system between windscreen wiper components provides the perfect adjustment between the windscreen wiper and the vehicle windscreen. The system includes the union of a big arc (1) and a small arc (4), which are isolated by a plastic joint (2) and united by a plastic pin (3). There is also a coupling and articulation mechanism between the big arc (1) and small arc (4).

6 Claims, 2 Drawing Sheets

ARTICULATION SYSTEM BETWEEN WINDSCREEN WIPER COMPONENTS

BACKGROUND OF THE INVENTION

The present invention is related to an ARTICULATION SYSTEM BETWEEN WINDSCREEN WIPER COMPONENTS, which purpose is to provide the perfect adjustment between the windscreen wiper and the vehicle windscreen.

The current state of the art presents several devices applied to windscreen wipers. However, there is a great inconvenience on the use of such devices regarding the adjustment of the wiping blade to the surface of the vehicle windscreen.

One of the problems associated with the movement of the blades over the vehicles windscreen refers to the curved shape of said windscreens, which must be followed by the windscreen wiper blade along all the mechanism path, in order to provide an optimized performance of the entire system.

For mechanisms with a single articulation, there is not a perfect adjustment of the wiper over the most curved portions of the windscreen, due to the structural stiffness of the arms that comprise the wiping mechanisms with a single articulated arm, resulting in loss of windscreen wiping efficiency in this portion.

There are also bi-articulated arms known on the art, for use in windscreen wiping mechanisms. However, the problem encountered in the use of such mechanisms regards the articulation precision between the arcs that comprise the system, which require, simultaneously, a perfect adjustment between said arcs, eliminating undesired slacks, but allowing the angular movement of one arc in relation to the other.

SUMMARY OF THE INVENTION

In order to solve such problems, it is an object of the present invention to provide an articulation system. The invention comprises a system used to articulate the arcs that comprise the structure of a windscreen wiper.

BRIEF DESCRIPTION OF THE DRAWINGS

The present invention will be better explained with the aid of the annexed Figures, of which.

DETAILED DESCRIPTION OF THE PREFERRED EMBODIMENT

Figure 1:
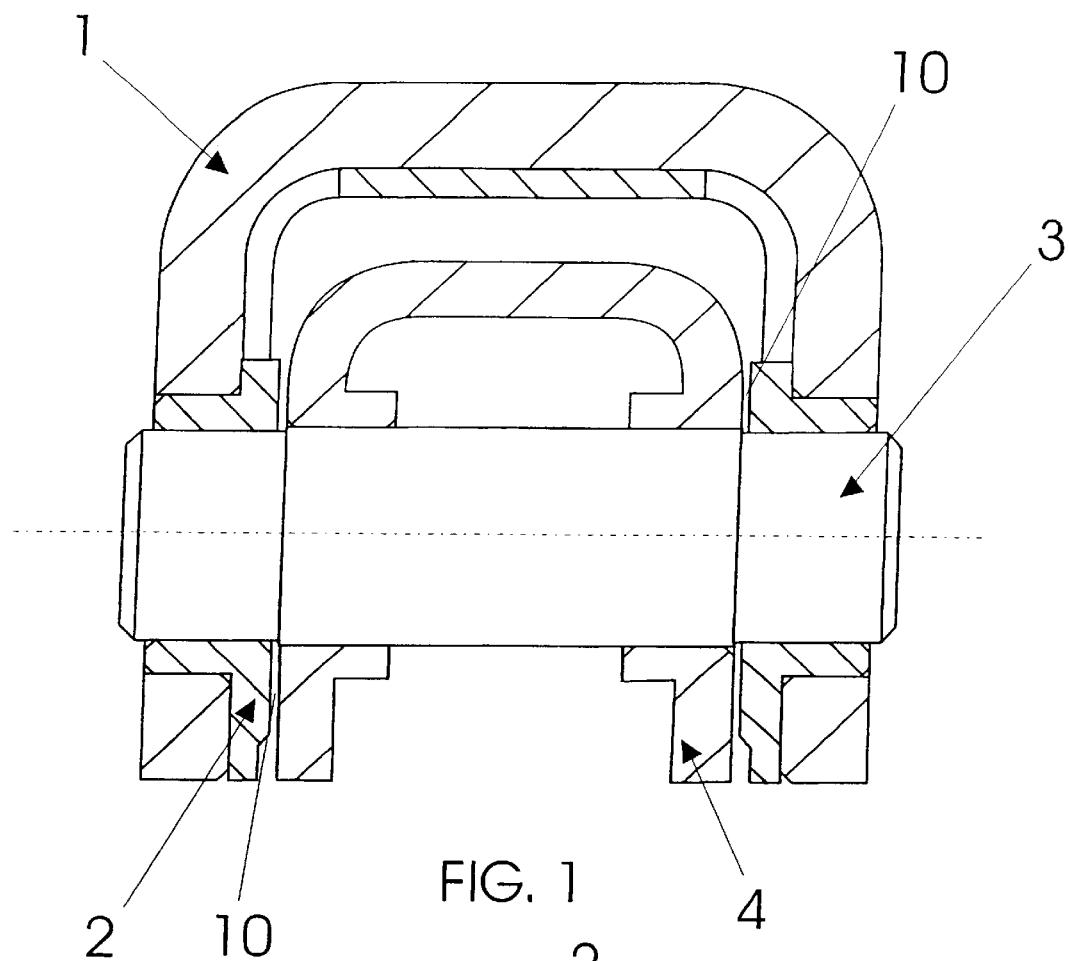
FIG. 1 is a cross sectional view of the articulation system of the present invention, showing the disposition of the system components.
Figure 2:
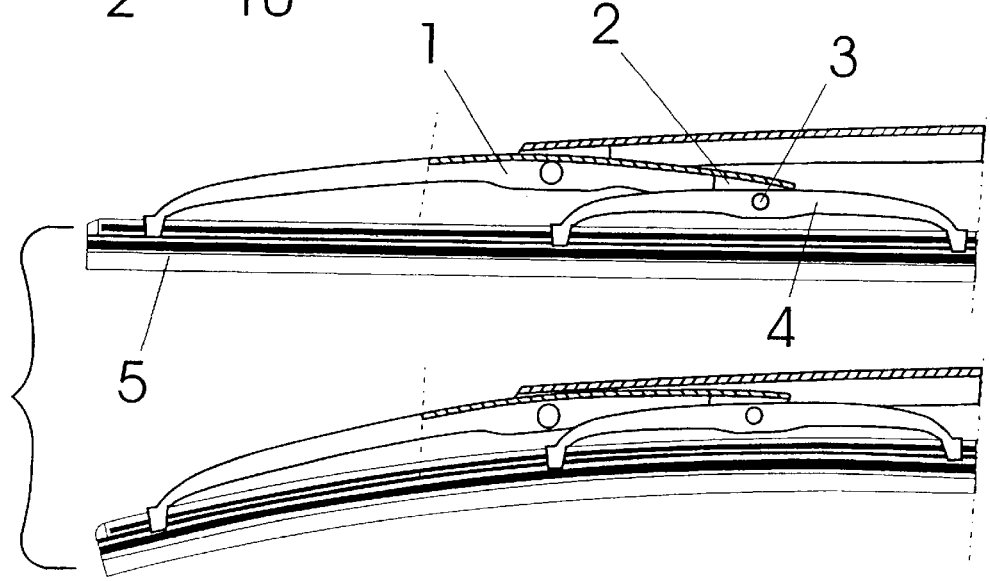
FIG. 2 is a side view, in partial cross section, of the windscreen wiper system components, showing the articulation system between the big and small arcs, in two different operational stages.

The annexed Figures show that the system is made by the union of two arcs, being one a big arc (1) and one a small arc (4), isolated by a plastic joint (2) and united by a plastic axis (3), as indicated on FIG. 1. FIG. 2, which depicts the system operating, shows the free rotation of the small arcs (4) and, consequently, a better adjustment of the wiping blade to the vehicle windscreen glass surface, optimizing the system performance. Furthermore, said system can be localized in different points of the wiper (5), according to the length of the wiper (5) and its geometrical configuration.

Figure 3:
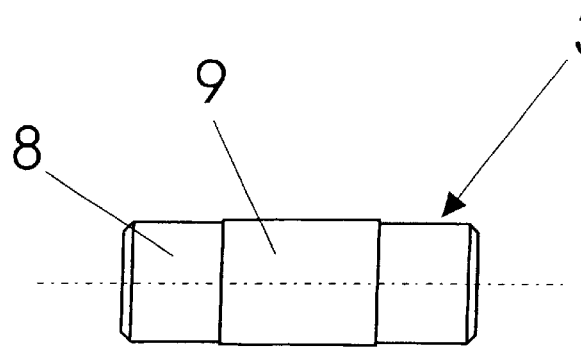
FIG. 3 is a side view of the articulation pin of the present invention.
Figure 4:
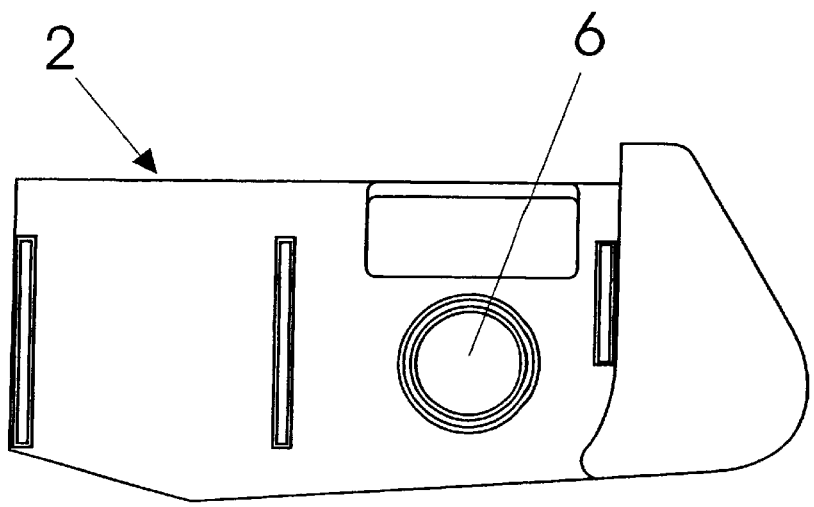
FIG. 4 is a side view of a joint of the present invention, that actuates as an interface between the big and small arcs.
Figure 5:
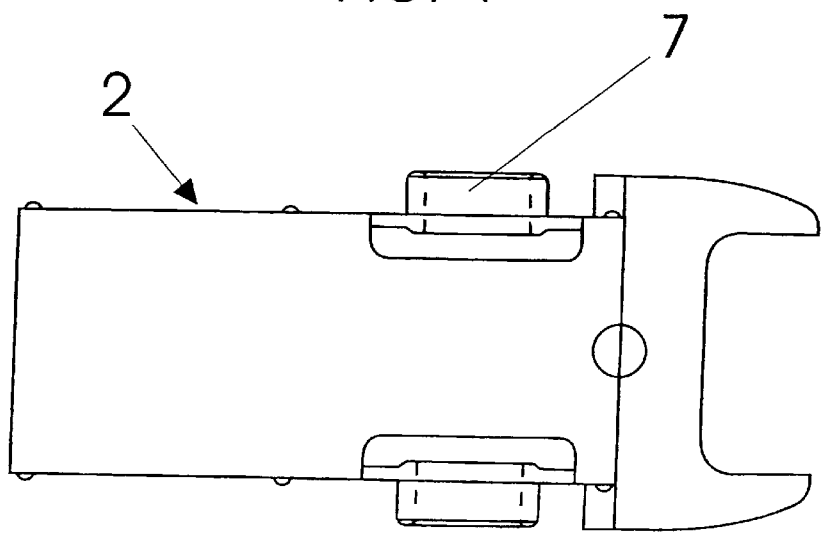
FIG. 5 is a top view of the joint of the present invention.

As can be observed on FIG. 1, the big arc (1) features holes which function is to house the joint (2) that in turn constitutes an interface element which function is to avoid the lateral contact between the big arc (1) and the small arc (4) and eliminate slacks in the system, ensuring the proper functioning of the windscreen wiper. The plastic joint (2) is housed in the lower portion of the big arc (1) and the articulation pin (3) and the small arc (4) are housed inside the joint (2). The joint (2) also features lateral holes (6) (FIG. 4), in which the articulation pin (3) is fitted, as seen on FIG. 3. Finally, the joint (2) presents bulges (7) around the holes (6) which act as coupling and positioning element between the joint (2) and the big arc (1). This way, the joint (2) features lateral thru bores (6), with their centers aligned with the bulges (7), inside which is housed the articulation pin (3), of which the ends (8) diameter corresponds to the diameter of the thru bores (6).

The FIG. 1 shows also that the articulation pin (3) and the small arc (4) are housed inside the joint (2). The diameter of the articulation pin (3), in its central portion (9), is bigger than the diameter at the ends (8), as seen on FIG. 3. That allows the axial locking of the system after assembly (eliminating slacks and the risk of undesired disassembly during operation), and serves to support and allow the free rotation of the small arc (4).

The small arc (4) is coupled to the central portion (9) of the articulation pin (3) by means of lateral thru bores on said small arc (4), with their centers aligned with the centers of the thru bores of the big arc (1).

FIG. 1 also shows the interference between the small arc (4) and the central portion of the pin (3), impeding the radial movement of the system. Between the joint (2) and the ends of the pin (3) there is an adjustment which allows free rotation of the small arc (4) in relation to the big arc (1), with a slack (10) between the lateral wall of said small arc (4) and the inner wall of the joint (2), being said slack big enough to account for the system articulation.

The articulation between the big arc (1) and the small arc (4) may take place in several points along the windscreen wiper (5), based on its curvature, so that it reaches the desired curvature in a given section of the windscreen optimizing the performance and the efficiency of the wiping system.

Thus the ARTICULATION SYSTEM BETWEEN WINDSCREEN WIPER COMPONENTS offers a perfect adjustment of the curvature of said wiper (5), regardless of the position of the mechanism over the windscreen, resulting in maximum efficiency of the process wiping the vehicle windscreen.

What is claimed is:

1. A windshield wiper mechanism for holding a windshield wiper comprising:
   a large arc having
       first and second large ends,
       a U-shaped cross section defining a large central bridge and opposed large free walls, and
       respective opposed lateral through holes in respective said opposed large free walls;
   a small arc having
       a small central portion,
       first and second small ends adapted to mount the wiper thereto, a U-shaped cross section defining a small central bridge and opposed small free walls, a small width of said small bridge being laterally smaller than a large width of said large bridge such that said small central portion fits laterally within said second large end leaving a lateral gap, a small length which is substantially shorter longitudinally than a large length of said large arc, and respective opposed small lateral through holes in respective said opposed small free walls of said small central portion, said small lateral through holes aligning with said large lateral through holes when said small central portion is positioned in said second large end; and a coupling means for coupling said small central portion of said small arc rotatably to said second large end of said large arc, said coupling means including a U-shaped plastic joint defining a joint central bridge and opposed joint fee walls, said joint free walls substantially laterally filling the lateral gap to prevent lateral contact thereat between said large arc and said small arc during relative rotation thereof, said plastic joint including (a) outwardly extending respective opposed bulges which fit into respective said large lateral through holes of said opposed large free walls to position and hold said plastic joint thereat, and (b) respective opposed bulge lateral through holes in respective said opposed bulges and respective said joint free walls which align with said small lateral through holes when said small central portion is positioned in said second large end with said plastic joint disposed therebetween, and an articulation pin which passes through said bulge lateral through holes and said small lateral through holes, said pin including (a) a pin central portion about which said small through holes of said small central portion are located, (b) pin ends about which respective joint free walls are located, and (c) a diameter of said pin central portion which is larger than a diameter of said pin ends such that said pin is locked into position between said bulges.

2. A windshield wiper mechanism as claimed in claim 1, wherein said first large end is adapted to mount the wiper thereto.

3. A windshield wiper mechanism as claimed in claim 2:

wherein said joint free walls fit laterally against respective said large free walls; and wherein said joint free walls substantially fill said lateral gap but leave a small play gap between said joint free walls and adjacent lateral ends of said pin central portion.

4. A windshield wiper mechanism as claimed in claim 3:

wherein said small free walls include respective inwardly extending flanges which extend inwardly along said pin central portion.

5. A windshield wiper mechanism as claimed in claim 1:

wherein said joint free walls fit laterally against respective said large free walls; and wherein said joint free walls substantially fill said lateral gap but leave a small play gap between said joint free walls and adjacent lateral ends of said pin central portion.

6. A windshield wiper mechanism as claimed in claim 1:

wherein said small free walls include respective inwardly extending flanges which extend inwardly along said pin central portion.

* * * * *